(12) United States Patent
Babucke et al.

(10) Patent No.: US 12,146,695 B2
(45) Date of Patent: Nov. 19, 2024

(54) REFRIGERATION APPLIANCE WITH COMPARTMENT WHICH CAN BE USED IN A VARIABLE MANNER

(71) Applicant: BSH Hausgeraete GmbH, Munich (DE)

(72) Inventors: Andreas Babucke, Heidenheim (DE); Oliver Janda, Winnenden (DE); Niels Liengaard, Ulm (DE); Clemens Mack, Sontheim (DE); Matthias Mrzyglod, Ulm (DE); Vitali Ulrich, Illertissen (DE); Carsten Weiss, Giengen (DE)

(73) Assignee: BSH Haugeraete GmbH, Munich (DE)

( * ) Notice: Subject to any disclaimer, the term of this patent is extended or adjusted under 35 U.S.C. 154(b) by 217 days.

(21) Appl. No.: 17/778,950

(22) PCT Filed: Nov. 11, 2020

(86) PCT No.: PCT/EP2020/081716
§ 371 (c)(1),
(2) Date: May 23, 2022

(87) PCT Pub. No.: WO2021/104864
PCT Pub. Date: Jun. 3, 2021

(65) Prior Publication Data
US 2022/0404068 A1    Dec. 22, 2022

(30) Foreign Application Priority Data

Nov. 27, 2019   (DE) ..................... 10 2019 218 352.2

(51) Int. Cl.
*F25B 5/00*      (2006.01)
*F25B 40/00*    (2006.01)
(Continued)

(52) U.S. Cl.
CPC ................ *F25B 5/00* (2013.01); *F25B 40/00* (2013.01); *F25B 41/20* (2021.01); *F25B 49/022* (2013.01);
(Continued)

(58) Field of Classification Search
CPC .. F25D 11/02; F25D 17/065; F25D 2317/068; F25B 5/00; F25B 40/00; F25B 41/20; F25B 49/022
See application file for complete search history.

(56) References Cited

U.S. PATENT DOCUMENTS

| 6,775,998 B2 * | 8/2004 | Yuasa ................... F25D 11/022 62/197 |
| 10,088,215 B2 | 10/2018 | Klingshirn et al. |

(Continued)

FOREIGN PATENT DOCUMENTS

| CN | 101568773 A | 10/2009 |
| CN | 101603751 A | 12/2009 |

(Continued)

OTHER PUBLICATIONS

University Physics Experiment, Editors-in-Chief: Ding Xifeng et al., 21st century higher education planning textbook, Beijing Institute of Technology Press, Edition/First edition, Aug. 2009, ISBN 978-7-5640-1821-4.

*Primary Examiner* — Marc E Norman
(74) *Attorney, Agent, or Firm* — Laurence A. Greenberg; Werner H. Stemer; Ralph E. Locher

(57) ABSTRACT

A refrigeration appliance with multiple storage compartments has a refrigerant circuit with a first expansion valve, a first heat exchanger, a second expansion valve, and a second heat exchanger connected in series between pressure and suction connections of a compressor. Each heat exchanger is associated with at least one storage compartment in order to control its temperature. A control unit
(Continued)

controls the compressor rotational speed and positions of the expansion valves. The control unit has a continuously linear regulator for each storage compartment with a P-component for estimating a required temperature control output using a difference between actual and target temperatures. A model computing unit ascertains a target evaporation temperature for a first storage compartment controlled by the first heat exchanger, and for a second storage compartment controlled by the second heat exchanger. The heat exchangers are operated by selecting the compressor rotational speed and the valve positions of the expansion valves.

12 Claims, 2 Drawing Sheets

(51) Int. Cl.
<table>
<tr><td>F25B 41/20</td><td>(2021.01)</td></tr>
<tr><td>F25B 49/02</td><td>(2006.01)</td></tr>
<tr><td>F25D 11/02</td><td>(2006.01)</td></tr>
<tr><td>F25D 17/06</td><td>(2006.01)</td></tr>
<tr><td>F25D 29/00</td><td>(2006.01)</td></tr>
</table>

(52) U.S. Cl.
CPC .......... *F25D 11/022* (2013.01); *F25D 17/065* (2013.01); *F25D 29/00* (2013.01); *F25B 2500/19* (2013.01); *F25B 2600/025* (2013.01); *F25B 2700/2117* (2013.01); *F25D 2317/068* (2013.01); *F25D 2500/04* (2013.01); *F25D 2700/10* (2013.01); *F25D 2700/12* (2013.01)

(56) References Cited

U.S. PATENT DOCUMENTS

<table>
<tr><td>10,670,305 B2*</td><td>6/2020</td><td>Kono ................. F25B 1/005</td></tr>
<tr><td>2004/0050083 A1</td><td>3/2004</td><td>Yuasa et al.</td></tr>
<tr><td>2010/0089079 A1</td><td>4/2010</td><td>Bauer et al.</td></tr>
<tr><td>2018/0231277 A1</td><td>8/2018</td><td>Liengaard et al.</td></tr>
<tr><td>2019/0032986 A1</td><td>1/2019</td><td>Babucke et al.</td></tr>
<tr><td>2019/0390882 A1</td><td>12/2019</td><td>Mrzyglod et al.</td></tr>
<tr><td>2021/0116160 A1*</td><td>4/2021</td><td>Mrzyglod ............ F25D 11/022</td></tr>
<tr><td>2022/0364781 A1*</td><td>11/2022</td><td>Babucke ................. F25B 6/04</td></tr>
</table>

FOREIGN PATENT DOCUMENTS

<table>
<tr><td>DE</td><td>102013226341 A1</td><td>6/2015</td></tr>
<tr><td>DE</td><td>102015216933 A1</td><td>3/2017</td></tr>
<tr><td>DE</td><td>102016202568 A1</td><td>8/2017</td></tr>
<tr><td>WO</td><td>2018177809 A1</td><td>10/2018</td></tr>
</table>

* cited by examiner

REFRIGERATION APPLIANCE WITH COMPARTMENT WHICH CAN BE USED IN A VARIABLE MANNER

FIELD AND BACKGROUND OF THE INVENTION

The present invention relates to a refrigeration appliance, in particular a household refrigeration appliance, having at least one storage compartment, which can be used at temperatures that are widely variable, possibly even at temperatures above an ambient temperature.

Such a refrigeration appliance is known from DE 2015 216 933 A1, for instance. With this known refrigeration appliance, heat exchangers of a first compartment and a second compartment with in each case an upstream and a downstream expansion valve are arranged in line sections of the refrigerant circuit which are parallel to one another and both sections lead to the evaporator of a third cooled compartment. With the aid of the expansion valves, the pressure in the first or second compartment can be defined largely arbitrarily between the outlet and intake pressure of a compressor and accordingly temperatures that are widely variable can be set in the compartments. However, keeping these temperatures constant with changing ambient temperatures is difficult, since each adjustment of an individual expansion valve results in changes to the pressure in more than one evaporator. This means that if the actual temperature in one compartment differs from the target temperature and by correcting the position of an expansion valve an attempt is made to prevent this difference, this has repercussions on other compartments, which in turn entail corrections. It may therefore take some time after the occurrence of a malfunction for the refrigeration appliance once again to reach a steady state, and differences from the target temperature which occur during this time may possibly have a negative impact on the shelf life of refrigerated goods stored in the refrigeration appliance.

SUMMARY OF THE INVENTION

There is therefore a requirement for a refrigeration appliance with at least one compartment which can be used at temperatures that are widely variable, which, in the case of a difference in a compartment temperature from the target value, is able to eliminate this difference quickly and in the process to minimize repercussions on other compartments.

This requirement is satisfied in accordance with the invention by, in the case of a refrigeration appliance having a number of storage compartments, a refrigerant circuit in which a first expansion valve, a first heat exchanger, a second expansion valve, and a second heat exchanger are connected in series between a pressure connection and a suction connection of a compressor, and wherein each heat exchanger is assigned to at least one storage compartment in order to control the temperature thereof, and a control unit for controlling the rotational speed of the compressor and for controlling positions of the expansion valves, the control unit comprising a continuously linear regulator for each storage compartment, said regulator comprising at least one P-component for estimating a required temperature control output using a difference between a target temperature and an actual temperature of the storage compartment, and a model computing unit which is designed to ascertain a target evaporation temperature for at least one first storage compartment of the storage compartments, the temperature of said first storage compartment being controlled by the first heat exchanger, and for a second storage compartment of the storage compartments, the temperature of said second storage compartment being controlled by the second heat exchanger using the required temperature control output thereof and to operate the heat exchanger of the first and second storage compartment at the target evaporation temperatures by selecting the rotational speed of the compressor and the positions of the valves. The P-component is understood here to mean a component in the output signal of the regulator which is proportional to the difference entered into the regulator. Furthermore, the regulator can have at least one further I-component, in other words a component which is proportional to the time integral of the difference, and/or a D-component, a component which is proportional to the time derivative of the difference.

The use of the term "heat exchanger" instead of "evaporator" takes into account the fact that the temperature-control effect can be not only a conventional cooling process through evaporation of liquid refrigerant in the heat exchanger, but in particular in the first heat exchanger also a heating process through condensation of refrigerant vapor or undercooling of already liquid refrigerant. The temperature at which evaporation or condensation take place is always referred to below for the sake of simplicity only as the evaporation temperature.

The heat exchangers have in each case a heat transfer coefficient determined by their type of construction, mounting dimensions and suchlike, which specifies the transmission capacity per degree of temperature difference between the refrigerant in the heat exchanger and its environment, i.e. the storage compartment which is temperature-controlled by the heat exchanger. A target evaporation temperature can therefore be obtained by reducing the compartment temperature by the quotient of the required temperature control output and heat transfer coefficient (wherein the sign of the required temperature control output is recorded as positive if the temperature control process involves cooling).

A heat exchanger can be combined in a known manner to increase the output with a fan, which drives the air circulation by way of the heat exchanger. In order to take into account the effect of the fan, in this case the heat transfer coefficient of the heat exchanger is assumed to be a function of an operating parameter of the fan, in particular its output or rotational speed. The association between the value of the operating parameter and the resulting heat transfer coefficient can be calculated via a formula during operation of the refrigeration appliance or consulted in a table, possibly produced on the basis of measurements performed on a prototype of the refrigeration appliance.

As a result of the possibility of varying the evaporation temperature in a heat exchanger, a desired compartment temperature can be achieved both with a low fan speed and a low evaporation temperature and also with a high fan speed and an evaporation temperature close to the desired compartment temperature, wherein in the first instance the drying of the air of the storage compartment is significantly greater as a result of the buildup of frost on the heat exchanger than in the latter. This fact can be exploited in order to set the air humidity in the storage compartment to a desired value.

Expediently, this humidity control can be restricted to the case that the deviation between actual and target temperature of the storage compartment does not exceed a limit value. In the case of a limit value overrun, a rapid cooling down of the compartment should have priority; to this end the fan should run independently of the temperature of the heat exchanger with a maximum rotational speed.

In order to be able to end a difference in a compartment temperature from its target value quickly and with minimal repercussions on other storage compartments, it is important that the control unit is able to estimate "correct" values of a manipulated variable in advance and not have to wait for its effects after performing a manipulated variable correction, in order then if necessary to compensate for these. To this end, if the control unit is configured to calculate a mass flow of refrigerant for each storage compartment, the evaporation of which covers the required temperature control output of the storage compartment, it contributes to totaling the mass flows to form a total mass flow and to selecting the rotational speed of the compressor so that the total mass flow is provided by the compressor. The evaporation can also have a "negative sign", i.e. if the temperature control involves heating up the storage compartment, condensation can take place in the relevant heat exchanger.

If a third heat exchanger of a third storage compartment is arranged downstream of the second heat exchanger without an interposed throttling point, particularly if the third storage compartment is a normal storage compartment and the second is a freezer compartment, refrigerant vapor coming from the second heat exchanger is relevant to the cooling effect of the third evaporator. In this case, the control unit should be configured to take into account the cooling power of the vapor flowing in from the second heat exchanger during the calculation of the mass flow of refrigerant to be evaporated in the third heat exchanger.

Since the vapor heats up by absorbing heat from the storage compartment and as a result the temperature difference from the storage compartment is gradually reduced, while liquid refrigerant remains at the evaporation temperature until it is completely evaporated, the heat transfer coefficient of the third heat exchanger is significantly different depending on whether it contains steam or liquid refrigerant. The control unit should take account of this, by it estimating a heat transfer coefficient of the third heat exchanger as a function of the volume ratio between the liquid and gaseous refrigerant at the transition between the second and third heat exchanger. Specifically, the heat transfer coefficient can be calculated as an average value between the heat transfer coefficient of the vapor-filled and liquid-filled third heat exchanger which is weighted on the basis of the volume ratio.

It is known per se to provide an internal heat exchanger in order to improve efficiency, in which compressed refrigerant upstream of the intake into a heat exchanger outputs heat to refrigerant vapor in a suction pipe leading back from one of the heat exchangers to the compressor. The influence of such an internal heat exchanger can be taken into account in an iterative process.

The refrigerant circuit can comprise a number of parallel line sections, of which one has the first expansion valve, the first heat exchanger and the second expansion valve and at least one other has a third expansion valve, a fourth heat exchanger and a fourth expansion valve. The fourth storage compartment can be controlled by the control unit just like the first and the second storage compartment.

BRIEF DESCRIPTION OF THE FIGURES

Further features and advantages of the invention result from the following description of exemplary embodiments with reference to the appended figure, in which.

DETAILED DESCRIPTION OF THE INVENTION

Figure 1:
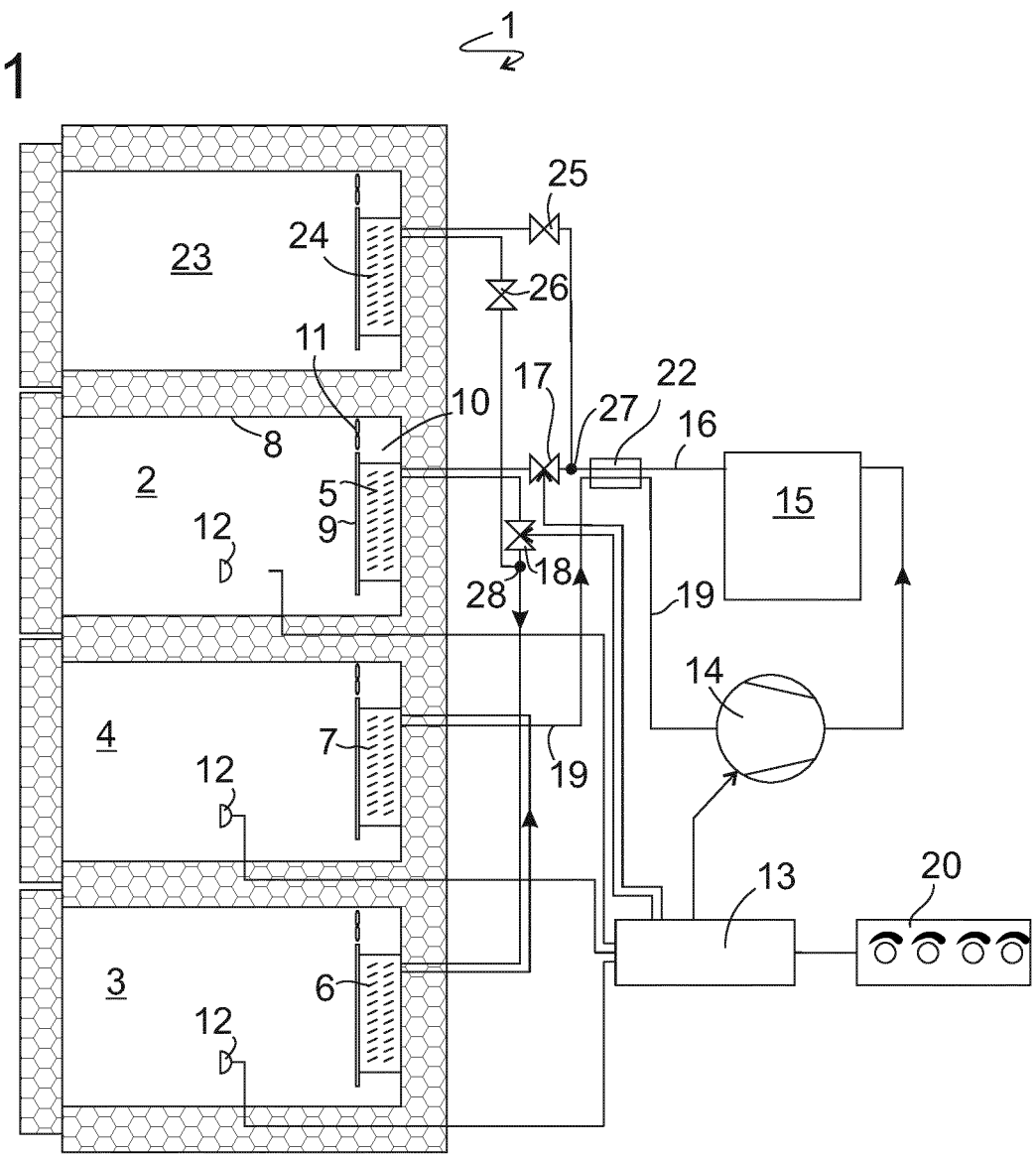
FIG. 1 shows a block diagram of an inventive refrigeration appliance.

FIG. 1 shows a block diagram of an inventive refrigeration appliance. In a heat-damping housing 1, at least three, here four storage compartments 2, 3, 4, 23, are cut out. Each of these storage compartments 2, 3, 4, 23 is assigned a heat exchanger 5, 6, 7, 24. The assignment can consist for instance in the heat exchanger being embedded in the manner of a cold wall evaporator between an inner container of the storage compartment and a layer of insulation material surrounding the inner container, or in the heat exchanger 5, 6, 7, 24 being assembled in the inner container 8 of the relevant storage compartment 2, 3, 4, 23. In the latter case, a separating wall 9 can be provided in the inner container, which separating wall subdivides the volume of the inner container into the storage compartment 2, 3, 4 and a heat exchanger chamber 10 which receives the heat exchanger 5, 6, 7.

Irrespective of how the heat exchanger 5, 6, 7, 24 is assigned to the storage compartment 2, 3, 4, 23, a fan 11 can be assigned to each heat exchanger 5, 6, 7, 24 in order to intensify the heat transfer between the storage compartment 2, 3, 4, 23 and its heat exchanger 5, 6, 7, 24. The rotational speed or output of such a fan 11 can be fixedly predetermined or, as explained again more precisely below, can be controlled.

Each storage compartment 2, 3, 4, 23 is equipped with a temperature sensor 12. Measured values of the temperature sensor 12 are detected by a control circuit 13.

A refrigerant circuit comprises, starting from a pressure connection of a compressor 14, in sequence a condenser 15, a pressure line 16, a first expansion valve 17, the heat exchanger 5, a second expansion valve 18, the second heat exchanger 6, the third heat exchanger 7 and a suction line 19, which leads to a suction connection of the compressor 14.

If, as shown in FIG. 1, a further fourth storage compartment 23 is provided, its heat exchanger 24, an upstream expansion valve 25 and a downstream expansion valve 26 can be arranged in a branch of the refrigerant circuit, which extends parallel to a branch, between two connection points 27, 28, which contains the expansion valves 17, 18 and the heat exchanger 5. If necessary, provision can be made for further parallel branches with in each case two expansion valves and a heat exchanger for controlling the temperature of further storage compartments.

The expansion valves 17, 18, 25, 26 are of a construction type known per se, not described here, and are designed to set an opening cross-section, predefined by a control signal, between the inlet and outlet. The source of the control signals is the control circuit 13.

The pressure line 16 and the suction line 19 run over one part of their length in a contrarotating manner in close contact with one another, in order thus to form an internal heat exchanger 22, in which the compressed refrigerant outputs residual heat to the vapor in the suction line 19 shortly before reaching the expansion valve 17.

The pressure difference occurring on the expansion valves 17, 25 is to a great extent variable. On the one hand, with a maximum opening of the expansion valve 17 (or 25) in the heat exchanger 5 (or 24), a pressure develops, which, if at all, only differs minimally from the pressure at the pressure connection of the compressor 14, so that condensation of refrigerant can take place in the heat exchanger 5 (or 24) and in the condenser 15, and the storage compartment 2 (23) can be operated at a target temperature above the ambient temperature, and refrigerant condensed in the condenser 15 and heat exchanger 5 and/or 24 is supplied to the heat exchangers 6 and 7 by way of the expansion valve 18. An upper limit of the temperature at which the storage compartment 2 or 23 can be operated should not amount to below +18° C.

In order to enable operation of the storage compartment 3 as a freezer compartment, even if the storage compartment 2 (and/or 23) is operated as a normal refrigeration compartment, a non-negligible drop in pressure at the expansion valve 18 is required. The maximum pressure difference at the expansion valve 18 should be enough to also then enable a freezer compartment operation of the storage compartment 3 if essentially the full outlet pressure of the compressor 14 is present at the input of the expansion valve 18.

There is no appreciable drop in pressure between the heat exchangers 6 and 7. In particular, both heat exchangers 6, 7 and a line connecting them can be manufactured from the same type of pipe with constant cross-sectional dimensions.

Target temperatures for all three storage chambers 2, 3, 4 can be set on a user interface 20 of the control circuit 13. If one of the storage chambers 2, 3, 4 has a fan 11, provision can also be made for the possibility to use the user interface 20 to select an air humidity value for the relevant storage chamber.

Figure 2:
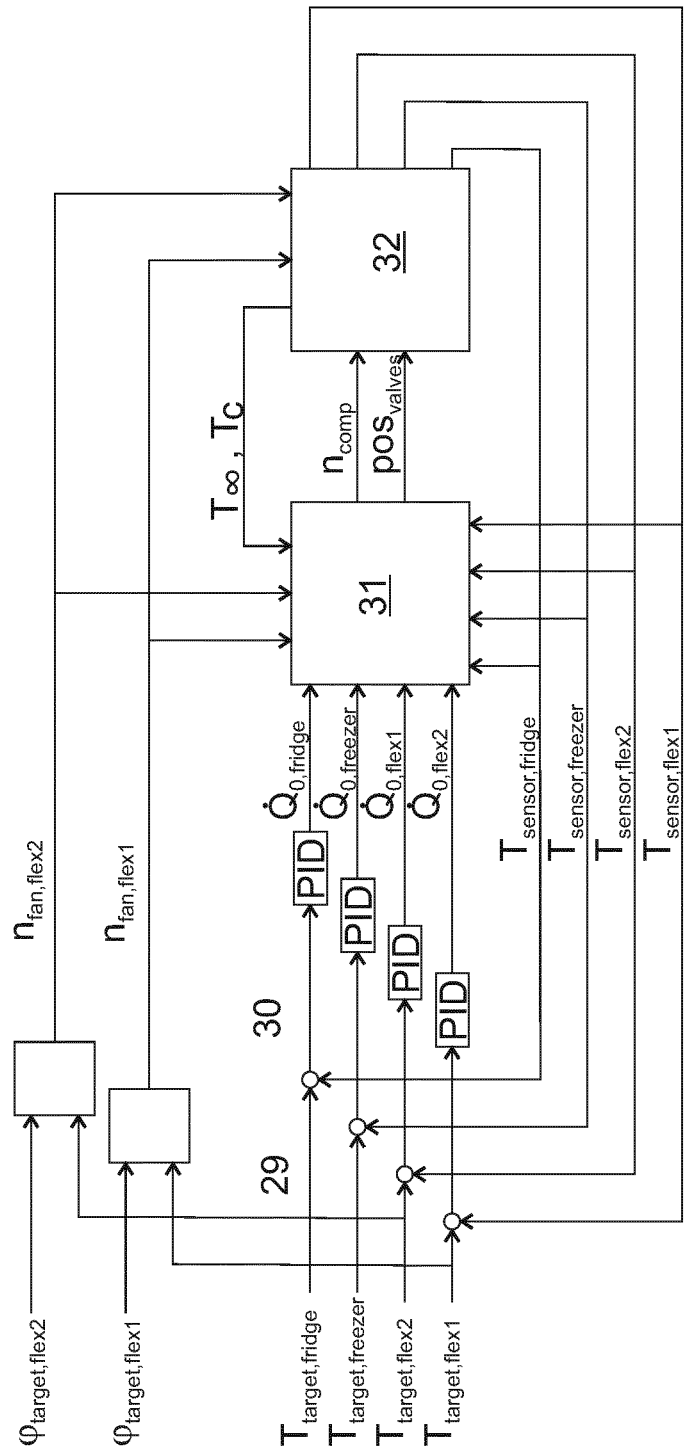
FIG. 2 shows a block diagram of a control unit of the refrigeration appliance.

FIG. 2 shows a block diagram of the control unit 13. At the left edge of the diagram, inputs for the setpoint variables set by the user on the interface 20 are shown, namely the target temperatures $T_{target, flex1}$ of the storage compartment 2, $T_{target, fridge}$ of the storage compartment 4 used as a normal cooling compartment and $T_{target, freezer}$ of the storage compartment 3 operated as a freezer compartment and facultatively $T_{target, flex2}$ of the storage compartment 23 and target humidity values $\varphi_{target, flex1}$ of the storage compartment 2 and $\varphi_{target, flex2}$ of the storage compartment 23.

Each target temperature and the associated actual temperature measured by the sensor 12, e.g. the temperatures $T_{target, flexI}$ and $T_{sensor, flexI}$, are present at the inputs of a differential circuit 29, in order to determine a target value difference which is in turn an input variable of a PID controller 30. Each PID controller 30 supplies an output signal, which is an estimated value for the required temperature control output $\dot{Q}_{0,1}$, $i\in\{flex1, flex2, freezer, fridge\}$, i.e. for the cooling or heating output which has presumably to be fed to the relevant storage compartment 2, 3, 4 23 in order to bring it to or retain its target temperature.

A model computing unit 31 receives as input variables the required temperature control outputs $\dot{Q}_{0,1}$ of the storage compartments 2, 3, 4, 23, the actual temperatures $T_{F,i}$ thereof measured by the sensors 12, boundary conditions such as for instance the condensation temperature $T_c$ in the condenser 15, the ambient temperature $T_\infty$, and, if a humidity controller of the compartments 2, 23 is provided, the rotational speeds $n_{fan,i}$ of its fans 11.

The output variables of the model computing unit 31 are positions $pos_{valve,i}$ of the expansion valves 16, 17, 25, 26 and the rotational speed $n_{compr}$ of the compressor 14. These already afore-described components are combined in the diagram in FIG. 2 in a controlled system 32.

The model computing unit 31 uses the known required temperature control outputs $\dot{Q}_{0,1}$, $i\in\{flex1, flex2, freezer, fridge\}$ to calculate the evaporation temperatures in the compartments 2, 23, 4, the temperature difference between the compartment and evaporator is produced from the refrigerant power and heat transfer capacity of the evaporator.

The evaporation enthalpy $\Delta h_{evap}$ is produced from the evaporation temperature of the freezer compartment 3, $T_{evap,freezer}$, the condensation temperature $T_c$, an assumed subcooling $\Delta T_{sc}$ and the transmitted enthalpy $\Delta h_{IHX}$ of the internal heat exchanger 22: the specific evaporation enthalpy is produced from the boiling/thawing line of condensation/evaporation temperature, the subcooling at the condenser end and the specific heat transfer of the inner heat exchanger.

The condensation temperature $T_c$ can be measured; alternatively it is estimated by the model computing unit 31 on the basis of the ambient temperature $T_\infty$ and the heat transfer coefficient $kA_{c,eff}$ of the condenser, wherein it is assumed that the heat output emitted by the condenser equates to the total of the required temperature control outputs absorbed by the heat exchangers 5, 6, 7, 24.

The enthalpy $\Delta h_{IHX}$ is a priori not known, here an empirical value can firstly be assumed from the past, which is then refined iteratively.

The evaporation rate in each of the heat exchangers 5, 6, 7, 24, i.e. how much refrigerant evaporates there per time unit (or in the case of the compartments 2, 23 possibly also condenses) is produced from the required temperature control output $\dot{Q}_{0,1}$ of the assigned compartment 2, 3, 4 or 23 and the evaporation enthalpy determined according to (2). The evaporating mass flow is calculated for the flex compartments 2, 23 and the freezer compartment 3 from the required temperature output and the evaporation enthalpy.

In the cooling compartment 4, a calculation purely by way of the evaporation enthalpy would be insufficient since here also refrigerant vapor, which passes from the heat exchanger 6 of the freezer compartment 3 into that of the cooling compartment 4, contributes $\dot{Q}_{0,gas}$ to the cooling effect of the heat exchanger 7 and is produced from the heat transfer of a warming one-phase medium.

If this contribution $\dot{Q}_{0,gas}$ is already greater than the required temperature control output $\dot{Q}_{0,fridge}$ of the cooling compartment 4, the rotational speed of the fan 11 of the cooling compartment 4 is reduced. Otherwise, according to equation (6), the portion $\xi_{2\,phase}$ of the heat exchanger 7 in which evaporation takes place is calculated.

If liquid coolant also flows into the heat exchanger 7, only a small portion is still available for the heat exchange with the converted steam; accordingly the contribution of the converted steam to the heat transfer coefficient of the heat exchanger 7 is reduced. This is taken into account by the evaporator region with a pure gas flow back into the calculation of the refrigeration power.

The mass flow evaporating in the cooling compartment heat exchanger is then produced from the difference between the refrigerant requirement and cooling power of the gas.

The total of the evaporating mass flows across all compartments produces the entire mass flow which the compressor conveys 14.

In a simple embodiment and as explained subsequently in more detail, the model computing unit 31 could now calculate and output the rotational speed of the compressor 14 required herefor. Here it would however have to neglect the influence of the internal heat exchanger 22.

For the enthalpy transmitted in the internal heat exchanger 22, is calculated from the difference between the high pressure temperature and exit temperature of the cooling compartment evaporator, the overall mass flow and the structure of the inner heat exchanger. The enthalpy at the exit of the KF evaporator calculates the enthalpy at the condenser exit, the enthalpy transfer of the inner heat exchanger and the quotient from the total of the temperature control outputs and mass flow. The temperature at the exit of the cooling compartment evaporator is then produced therefrom.

The determination of the compressor speed on the basis of the total mass flow is carried out on the basis of the suction gas density, an estimate for the service level and the compressor-specific displaced volume.

The evaporation temperatures or pressures determined from the above calculations, the specific enthalpies and thus the gas portions at the corresponding positions of the refrigerant circuit (and if parallel heat exchangers such as here 5 and 24 are available, the division of the mass flow hereto) are boundary conditions for a valve model, with which the model computing unit 31 calculates the correct positions of the expansion valves.

As mentioned above, there may be the option to predefine a desired air humidity in the compartment 2 or 23 on the user interface 20.

If a compartment i (2, 3, 4 or 23) is cooled, its heat exchanger 5, 6, 7 or 24 is the coldest point. The steam pressure of the water in the air of the compartment can therefore only be as high as that to which the saturation vapor pressure corresponds at the temperature of the heat exchanger. The greater the temperature difference between the storage area of the compartment and the evaporator, the lower therefore the relative air humidity in the storage area. In order to set a given target temperature in the compartment, the fan of the compartment can run fast with a small temperature difference or slowly with a high temperature difference; in one case there is a high air humidity and in the other a low air humidity. In order to reach a predefined relative air humidity in a compartment, the model computing unit 31 selects the evaporation temperature $T_{evap,i}$ of the heat exchanger assigned to the compartment so that the saturation vapor pressure $P_{sat,i}(T_{evap,i})$ of water produces the desired relative air humidity at this temperature at the target temperature of the compartment and controls the speed of the fan so that the target temperature of the compartment is reached.

If the difference between the actual and target temperature of the compartment exceeds a predefined limit value, this type of regulation can be discontinued and the fan can be set so that as efficient a cooling as possible of the compartment is achieved. This is generally a high fan speed, however for acoustic reasons this rotational speed can be lower than a specified maximum rotational speed of the fan.

REFERENCE CHARACTERS

1 Housing
2 Storage compartment
3 Storage compartment
4 Storage compartment
5 Heat exchanger
6 Heat exchanger
7 Heat exchanger
8 Inner container
9 Separating wall
10 Heat exchanger chamber
11 Fan
12 Temperature sensor
13 Control circuit
14 Compressor
15 Condenser
16 Pressure line
17 Expansion valve
18 Expansion valve
19 Suction line
20 User interface
21 Fan
22 Internal heat exchanger
23 Storage compartment
24 Heat exchanger
25 Expansion valve
26 Expansion valve
27 Connection point
28 Connection point
29 Differential circuit
30 PID controller
31 Model computing unit
32 Controlled system

The invention claimed is:

1. A refrigeration appliance, comprising:
a plurality of storage compartments;
a refrigerant circuit in which a first expansion valve, a first heat exchanger, a second expansion valve, and a second heat exchanger are connected in series between a pressure connection and a suction connection of a compressor;
each of said heat exchangers being assigned at least one of said storage compartments in order to control a temperature thereof;
a controller for controlling a rotational speed of said compressor and for controlling respective valve positions of said expansion valves;
said controller including:
a continuously linear regulator for each of said storage compartments, said regulator comprising at least one proportional component for estimating a required temperature control output using a difference between a target temperature and an actual temperature of the respective storage compartment; and
a model computing unit configured to
determine a target evaporation temperature for at least one first storage compartment of said storage compartments, the temperature of said first storage compartment being controlled by said first heat exchanger, and for a second storage compartment of said storage compartments, the temperature of said second storage compartment being controlled by said second heat exchanger, using the required temperature control output of said second storage compartment; and to operate said first and second heat exchangers of said first and second storage compartments at the target evaporation temperatures by selecting the rotational speed of said compressor and the valve positions of said expansion valves; and
said controller being configured to calculate a mass flow of refrigerant for each of said respective storage compartments, an evaporation of which mass flow covers said required temperature control output of said respective storage compartment, to total the mass flows to form a total mass flow, and to select the rotational speed of said compressor such that said compressor provides the total mass flow.

2. The refrigeration appliance according to claim 1, wherein the target evaporation temperature of a respective storage compartment is calculated using an actual temperature of the respective storage compartment, corrected by a quotient of the required temperature control output and a heat transfer coefficient of the heat exchanger of said respective storage compartment.

3. The refrigeration appliance according to claim 2, which comprises a fan assigned to said respective heat exchanger, and wherein the heat transfer coefficient of the heat exchanger is a function of an operating parameter of the fan.

4. The refrigeration appliance according to claim 3, wherein said controller is configured to set the operating parameter of the fan using an evaporation temperature and a target air humidity of said respective storage compartment.

5. The refrigeration appliance according to claim 1, further comprising an internal heat exchanger, wherein said controller is configured to iteratively calculate the evaporation enthalpy of the refrigerant based at least in part on a contribution of said internal heat exchanger.

6. The refrigeration appliance according to claim 1, wherein said refrigerant circuit comprises a plurality of parallel line sections, including one line section that contains said first expansion valve, said first heat exchanger and said second expansion valve, and at least one other said line section that contains a third expansion valve, a further heat exchanger and a further expansion valve.

7. The refrigeration appliance according to claim 1, configured as a household refrigeration appliance.

8. A refrigeration appliance, comprising:
a plurality of storage compartments;
a refrigerant circuit in which a first expansion valve, a first heat exchanger, a second expansion valve, and a second heat exchanger are connected in series between a pressure connection and a suction connection of a compressor;
each of said heat exchangers being assigned at least one of said storage compartments in order to control a temperature thereof;
a controller for controlling a rotational speed of said compressor and for controlling respective valve positions of said expansion valves;
said controller including:
a continuously linear regulator for each of said storage compartments, said regulator comprising at least one P component for estimating a required temperature control output using a difference between a target temperature and an actual temperature of the respective storage compartment; and
a model computing unit configured to determine a target evaporation temperature for at least one first storage compartment of said storage compartments, the temperature of said first storage compartment being controlled by said first heat exchanger, and for a second storage compartment of said storage compartments, the temperature of said second storage compartment being controlled by said second heat exchanger, using the required temperature control output thereof; and to operate said first and second heat exchangers of said first and second storage compartments at the target evaporation temperatures by selecting the rotational speed of said compressor and the valve positions of said expansion valves; and
said target evaporation temperature of a respective storage compartment being calculated using an actual temperature of the respective storage compartment, corrected by a quotient of the required temperature control output and a heat transfer coefficient of the heat exchanger of said respective storage compartment.

9. The refrigeration appliance according to claim 8, wherein said controller is configured to calculate a mass flow of refrigerant for each of said respective storage compartments, an evaporation of which mass flow covers said required temperature control output of said respective storage compartment, to total the mass flows to form a total mass flow, and to select the rotational speed of said compressor such that said compressor provides the total mass flow.

10. The refrigeration appliance according to claim 9, which comprises a third heat exchanger of a third storage compartment arranged downstream of said second heat exchanger without an intermediate throttling point, and wherein said controller is configured to calculate the mass flow of refrigerant to be evaporated in said third heat exchanger based at least in part on a cooling capacity of steam flowing into said third heat exchanger.

11. The refrigeration appliance according to claim 10, wherein said controller is configured to estimate a heat transfer coefficient of said third heat exchanger or a heat flux via said third heat exchanger as a function of a ratio between liquid and gaseous refrigerant at a transition between said second and third heat exchangers.

12. A refrigeration appliance, comprising:
a plurality of storage compartments;
a refrigerant circuit in which a first expansion valve, a first heat exchanger, a second expansion valve, and a second heat exchanger are connected in series between a pressure connection and a suction connection of a compressor;
each of said heat exchangers being assigned at least one of said storage compartments in order to control a temperature thereof;
a controller for controlling a rotational speed of said compressor and for controlling respective valve positions of said expansion valves;
said controller including:
a continuously linear regulator for each of said storage compartments, said regulator comprising at least one P component for estimating a required temperature control output using a difference between a target temperature and an actual temperature of the respective storage compartment; and
a model computing unit configured to determine a target evaporation temperature for at least one first storage compartment of said storage compartments, the temperature of said first storage compartment being controlled by said first heat exchanger, and for a second storage compartment of said storage compartments, the temperature of said second storage compartment being controlled by said second heat exchanger, using the required temperature control output thereof; and to operate said first and second heat exchangers of said first and second storage compartments at the target evaporation temperatures by selecting the rotational speed of said compressor and the valve positions of said expansion valves; and
an internal heat exchanger, said controller being configured to iteratively calculate the evaporation enthalpy of the refrigerant based at least in part on a contribution of said internal heat exchanger.

* * * * *